A. BOECLER.
DEVICE FOR RECOVERING RUBBER SOLVENTS.
APPLICATION FILED JUNE 20, 1921.
1,426,949.
Patented Aug. 22, 1922.
2 SHEETS—SHEET 1.
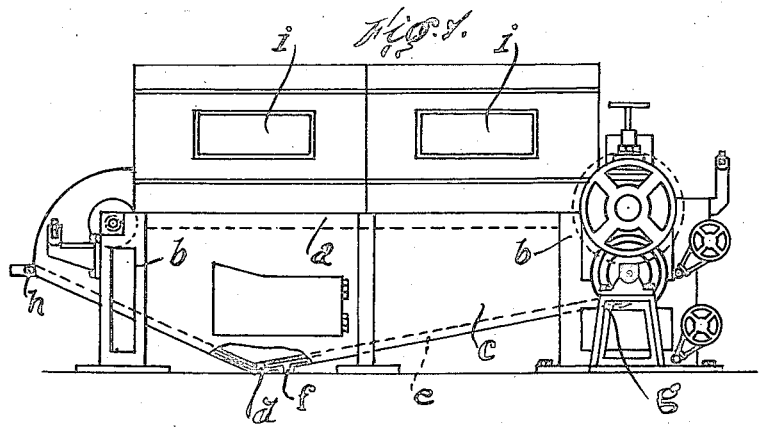
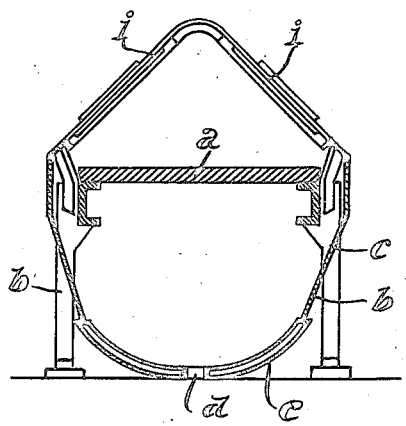
Inventor
Albert Boecler
By his Attorney
Charles G Hensley A. BOECLER.
DEVICE FOR RECOVERING RUBBER SOLVENTS.
APPLICATION FILED JUNE 20, 1921.
1,426,949.
Patented Aug. 22, 1922.
2 SHEETS—SHEET 2.
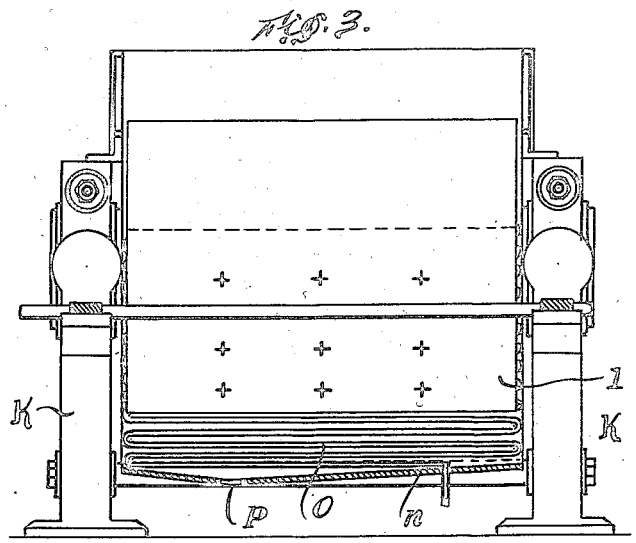
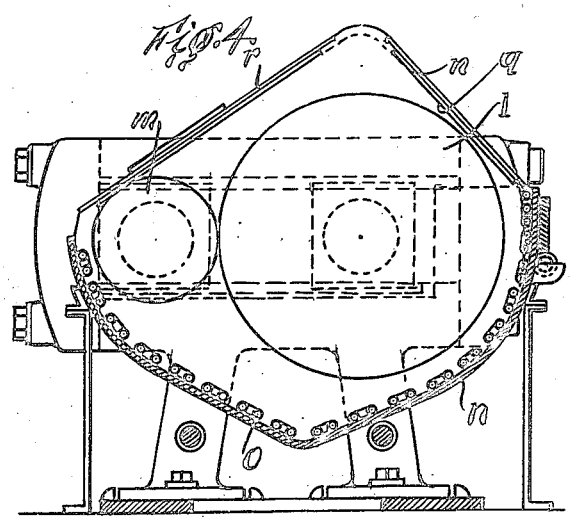
Inventor
Albert Boecler
By his Attorney
Charles G. Hensley

UNITED STATES PATENT OFFICE.

ALBERT BOECLER, OF MALMO, SWEDEN.

DEVICE FOR RECOVERING RUBBER SOLVENTS.

1,426,949.  Specification of Letters Patent.  Patented Aug. 22, 1922.

Application filed June 20, 1921. Serial No. 479,115.

*To all whom it may concern:*

Be it known that I, ALBERT BOECLER, a citizen of Germany, and a resident of Malmo, in the county of Malmohus, Kingdom of Sweden, have invented certain new and useful Improvements in Devices for Recovering Rubber Solvents, of which the following is a specification.

In the treatment of rubber mixtures in sheet making machines and in calender machines for the production of rubber textures in the form of rubber asbestos sheets and also in the treatment of rubber goods in other forms of apparatus, the solvent of the rubber, such as benzine, generally is permitted to escape into the work room and is lost except where means are provided for recovering the solvent.

It is the object of the present invention to provide improved means for recovering the solvent from rubber mixtures during the making of rubber asbestos sheeting materials and during the coating of fabrics with rubber and in other processes where dissolved rubber or rubber mixtures are applied upon surfaces or made into articles, while they are being worked upon in the machine, by condensing or precipitating the solvent and collecting it in the form of a liquid. For this purpose I provide a casing which completely encloses the machine during working and this casing is so constructed and so cooled that a circulation of the vapors is maintained and the vapors are rapidly and more completely precipitated or liquefied, so that a very high percentage of the solvent employed in the rubber used in the machine is recovered for subsequent use. By recovering a high percentage of the solvent the cost of making products partly or wholly of rubber is materially reduced. In the preferred construction the enclosing casing is divided into two compartments by the heated work table or else by the rollers which operate on the stock, the compartments being connected by more or less restricted passage ways at the sides near the walls of the casing. Only the walls of the lower compartment of the casing below the work table or rollers are cooled by suitable means such as water circulating tubes or a water jacket, in order to establish circulation within the casing and to condense the vapor of the solvent in the lower compartment.

Owing to the fact that the casing is practically completely closed, the vapors of the solvent will be at a somewhat lower pressure in the lower compartment or lower portion of the casing as compared with the upper compartment or upper portion of the casing above the work table or rollers, and this will facilitate the evolution, collection and condensation of the vapors. The vapors of the solvent are denser than the air and therefore at the commencement of the treatment they sink to the bottom and they are to a certain extent drawn into the lower compartment or the lower portion of the casing. If the apparatus is completely filled with solvent vapors or gases these are cooled to a certain extent on the upper surface of the apparatus, but as the warmer gases are always being evolved, these cooled gases or vapors descend around the walls into the lower compartment or the lower portion of the casing toward which they are to a certain extent drawn, as a partial vacuum is produced in the lower portion of the casing by the condensation of the cooled gases by the water cooled walls. The liquid (condensed solvent) which collects in the bottom of the casing can be drawn off through an opening at the lowest part thereof. The solvent or its gases can not escape from the casing as the latter is completely closed so that no part of the solvent or vapors is lost nor are the people who operate the machine injured by the vapors.

In the drawings forming part of this application,

Figure 1 is a side elevation, partly in section, of a sheeting machine,

Figure 2 is a cross section thereof,

Figure 3 is a front elevation, partly broken away, of a calender machine for making rubber-asbestos sheets, and Figure 4 is a cross section thereof.

The present invention in its broad aspect comprises an entirely closed casing which encloses the rubber working machine and which casing is provided with cooling means for its lower portion whereby a circulation of the vapors in the casing is maintained without the use of mechanical means such as a blower. Circulation is an important factor and this is maintained in the present case in great part by the application of the cooling medium at the proper location.

In the drawings I have shown two forms of machines embodying the broad features of my invention.

Both the machines are shown with the devices for recoving the benzine applied thereto. In the sheeting machine illustrated in Figures 1 and 2, the work table *a* is mounted on supports *b*. This work table is completely surrounded by the casing *c*, although the supports *b* project therethrough, and the table divides the casing into two compartments connected only by narrow passageways at the sides close to the walls. The sides of the lower compartment are inclined, to permit of an easy downflow of the benzine condensed thereon. The walls of this compartment are made double in the lower part to form a cooling jacket *e*, so that water for cooling purposes can be contained therein. For the admission of the cooling water an opening *f* is provided in the cooling jacket, and for the exit of the water two openings *g* and *h* are provided. The cooling device might consist of cooling tubes instead of a water jacket like those shown in Figs. 3 and 4. Devices for heating roller —1— are well known in fact this is part of a standard rubber machine.

The upper compartment of the casing *e* above the table *a* is enclosed by transparent plates *i* which permit of continual supervision of the operation.

The work table *a* is generally heated but I have for simplicity omitted the device for heating this table as such means are well known in the art.

In the case of machines, of which the working appliances are in the form of cylinders, as in calender machines (Figures 3 and 4), the device for recovering the solvent can also be arranged to surround the working appliances completely. In these machines cylinders *l* and *m*, of which one (*l*) is heated, are mounted between the lateral supports *k* and driven in any suitable manner. The cylinders are enclosed on all sides in a casing *n* which is mounted between the lateral supports, and the said cylinders have the effect of dividing this casing into two compartments connected only by narrow passage-ways at the sides close to the walls. The inclined side and bottom faces of the lower compartment are covered with cooling tubes *o* which correspond with the cooling jacket of the sheeting machine illustrated in Figures 1 and 2. Also in this case an opening *p* is provided for the outflow of the benzine. In order that the cylinders *l* and *m* may be accessible, the casing is provided with plates *q* and *r* at the top.

The operation of the device is as follows:—

The benzine vapors formed in the sheeting machine or in the calender machine collect in the upper compartment of the casing *c* of the sheeting machine (Figures 1 and 2) or casing *n* of the calender machine (Figures 3 and 4); as they cannot escape, the vapors become partly cooled and in consequence of their weight and density and the partial vacuum formed in the lower compartment they pass into this compartment wherein they are completely cooled and condensed by the cooling jacket *e* or the cooling tubes *o*. The liquid thus formed flows out through the opening *d* of the sheeting machine, or through the opening *p* in the calender machine.

Having described my invention, what I claim is:

1. A device for the recovery of solvent from rubber mixtures used in the production of materials made partly or wholly of rubber, the combination with a rubber machine having a support over which the product is passed while the solvent is evaporating through the application of heat thereto, of a casing completely enclosing and surrounding said support and forming a vapor evolving or expansion chamber above said support and a larger, vapor condensing chamber below said support and cooling means only for the lower chamber for the purpose of condensing the vapors therein and for maintaining circulation from the upper to the lower chamber by condensation of the vapors in the lower chamber.

2. A device for the recovery of solvent from rubber mixtures used in the production of materials made partly or wholly of rubber, the combination with a rubber machine having a support over which the product is passed while the solvent is evaporating through the application of heat thereto, of a casing completely enclosing and surrounding said support and having an inclined bottom to collect the liquid said casing surrounding and enclosing said support and forming a vapor evolving or expansion chamber above said support and a larger vapor condensing chamber below said support and cooling means only for the lower chamber for the purpose of condensing the vapors therein and for maintaining circulation from the upper to the lower chamber by condensation of the vapors in the lower chamber.

Signed at the American consulate at Malmo in the county of Skan and Kingdom of Sweden this 22nd day of April, 1921.

ALBERT BOECLER.